(12) United States Patent
Brück et al.

(10) Patent No.: US 8,668,876 B2
(45) Date of Patent: Mar. 11, 2014

(54) CONFIGURATION HAVING TWO INTERCONNECTED EXHAUST GAS TREATMENT DEVICES

(71) Applicant: EMITEC Gesellschaft fuer Emissionstechnologie mbH, Lohmar (DE)

(72) Inventors: Rolf Brück, Bergisch Gladbach (DE); Kait Althöfer, Wiehl (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/903,115

(22) Filed: May 28, 2013

(65) Prior Publication Data

US 2013/0259759 A1    Oct. 3, 2013

Related U.S. Application Data

(63) Continuation of application No. PCT/EP2011/070358, filed on Nov. 17, 2011.

(30) Foreign Application Priority Data

Nov. 26, 2010  (DE) .................. 10 2010 052 650

(51) Int. Cl.
*B01D 53/92* (2006.01)
(52) U.S. Cl.
USPC ........... 422/169; 422/168; 422/174; 422/177; 219/202; 219/520
(58) Field of Classification Search
USPC .......... 422/168, 169, 174, 177, 180; 219/202, 219/482, 520
See application file for complete search history.

(56) References Cited

U.S. PATENT DOCUMENTS

2010/0126984 A1 *   5/2010   Konieczny et al. ........... 219/520

* cited by examiner

*Primary Examiner* — Walter D Griffin
*Assistant Examiner* — Jelitza Perez
(74) *Attorney, Agent, or Firm* — Laurence A. Greenberg; Werner H. Stemer; Ralph E. Locher

(57) ABSTRACT

A configuration includes two exhaust gas treatment devices disposed in succession in an exhaust gas line. A first exhaust gas treatment device has a first subregion connected through at least one support body to a second subregion of a second exhaust gas treatment device. The support body has opposite ends connected by connections points to respective subregions. At least the second subregion is formed by metallic components that contact one another to form contact surfaces and at most 20% of the area of the contact surfaces have brazed or solder connections and/or diffusion connections.

9 Claims, 4 Drawing Sheets

CONFIGURATION HAVING TWO INTERCONNECTED EXHAUST GAS TREATMENT DEVICES

CROSS-REFERENCE TO RELATED APPLICATION

This application is a continuation, under 35 U.S.C. §120, of International Application No. PCT/EP2011/070358, filed Nov. 17, 2011, which designated the United States; this application also claims the priority, under 35 U.S.C. §119, of German Patent Application DE 10 2010 052 650.9, filed Nov. 26, 2010; the prior applications are herewith incorporated by reference in their entirety.

BACKGROUND OF THE INVENTION

Field of the Invention

The present invention relates to a configuration having two exhaust gas treatment devices disposed in series in an exhaust gas line, in particular in an exhaust gas line of an internal combustion engine, in which one exhaust gas treatment device is supported on the other exhaust gas treatment device through at least one support body.

International Publication No. WO 2008/145556 A1, corresponding to U.S. Pat. No. 8,164,034, discloses a honeycomb body configuration in which an electrically heatable honeycomb body is supported on a downstream support catalytic converter by supporting pins. Among the proposals therein is that of providing as small a number of supporting pins as possible. Reference is also made therein to a special assembly method for the configuration.

Electrically heatable catalytic converters are increasingly being used in modern exhaust gas systems because strict regional exhaust regulations are leading to ever greater attention being given especially to the cold starting behavior of exhaust gas systems on motor vehicles. By heating up the exhaust gas stream and/or the catalytically active surface, an electric heating catalytic converter shortens the time required by the exhaust gas treatment units provided in the exhaust gas line to reach a minimum temperature required to convert pollutants. As a result, it is possible to remove pollutants from the exhaust gas or to convert them reliably and virtually completely, even during the cold starting phase of an internal combustion engine.

In many cases, heating catalytic converters are constructed in the manner of a (short) disk and can be employed in a configuration with an additional "support catalytic converter," in which the honeycomb structures of the two catalytic converters are connected to one another by support bodies. The positioning of the support bodies can also be used to form (electrically insulating) air gaps in the honeycomb structures, with the air gaps ensuring a predetermined flow path through the electric heater.

The increased use of such heaters and/or heating catalytic converters likewise leads to increased demands on such components. Thus, honeycomb structures with wall thicknesses that are as thin as possible and/or with a high channel density, which achieve a rapid reaction time and a high degree of effectiveness in the conversion of pollutants, are used. However, the exhaust gas treatment devices configured in that way are also susceptible to damage which occurs precisely when a honeycomb body is used as a support catalytic converter for an electrically heatable catalytic converter as a result of the fact that the support catalytic converter has to accommodate support bodies to enable the electrically heatable catalytic converter to be disposed in a manner electrically insulated from the exhaust gas line and in such a way as to be mechanically fixed.

SUMMARY OF THE INVENTION

It is accordingly an object of the invention to provide a configuration having two interconnected exhaust gas treatment devices, which overcomes the hereinafore-mentioned disadvantages and at least partially solves the highlighted problems of the heretofore-known configurations of this general type and, in particular, specifies a configuration of two exhaust gas treatment devices disposed in series which can resist increased mechanical stresses during operation on a sustained basis.

With the foregoing and other objects in view there is provided, in accordance with the invention, a configuration comprising two exhaust gas treatment devices disposed in series in an exhaust gas line, in particular an exhaust gas line of an internal combustion engine of a motor vehicle. A first exhaust gas treatment device is connected by a first subregion to a second subregion of a second exhaust gas treatment device through at least one support body. The support body has opposite ends and is connected through attachment points to respective subregions at the ends. At least the second subregion is formed by metallic components. The metallic components form contact surfaces by mutual contact and at most 20% of the area of the contact surfaces has at least brazed joints or diffusion joints.

Attention is drawn herein particularly to International Publication No. WO 2008/145556 A1, corresponding to U.S. Pat. No. 8,164,034, cited above, which is hereby incorporated fully by reference into the description of the construction of the configuration and/or the configuration of the support bodies, and the support bodies presented herein can correspond to the supporting pins described therein. In particular, the present configuration is an apparatus including an electrically heatable honeycomb body (first exhaust gas treatment device) and a "support catalytic converter" (catalytically coated second exhaust gas treatment device) disposed downstream of the latter, wherein the catalytic converters preferably have separate housing parts. The second exhaust gas treatment device takes over the function of mechanically supporting the first exhaust gas treatment device. For this purpose, the second exhaust gas treatment device holds the first exhaust gas treatment device in a predetermined relative position in the axial direction, i.e. in the throughflow direction of the exhaust gas and, in particular, also in the radial direction and in the circumferential direction. In particular, the electrically heatable honeycomb body (first exhaust gas treatment device) has zones which are electrically insulated from one another and which are more susceptible to movement both in the axial direction and in the radial direction or in the circumferential direction of the honeycomb body. The fixing of the honeycomb structure of the electrically heatable honeycomb body is achieved by the support bodies presented herein, which are in each case attached materially (the term "material joints" refers to all joints in which the partners in the joint are held together by atomic or molecular forces) to metallic components by individual or a plurality of attachment points in the first exhaust gas treatment device, on one hand, and also in the second exhaust gas treatment device disposed downstream.

Accordingly, the first exhaust gas treatment device mentioned herein is, in particular, an electrically heatable honeycomb body, and the second exhaust gas treatment device presented herein is furthermore a "support catalytic converter."

The support body is, in particular, a metal pin, at least one end of which has an electric insulator. In principle, it is also possible for a plurality of pins, if appropriate disposed on a common pin holder, to form a support body. Moreover, different kinds of pins, pin holders, etc. can be combined with one another. The support body is preferably connected in a mechanically fixed manner to the honeycomb structure of the first exhaust gas treatment device and of the second exhaust gas treatment device, thus ensuring support (for the honeycomb structure) of the first exhaust gas treatment device by (the honeycomb structure) of the second exhaust gas treatment device. In particular, the support body has at least partial electric insulation to cover the eventuality that the first exhaust gas treatment device includes an electrically heatable honeycomb body which is disposed in an electrically insulated manner relative to the second exhaust gas treatment device and, in particular, also relative to the exhaust gas line and/or the housing. In particular, the support body is force-lockingly connected ("force-locking joints" are formed by the transmission of forces, e.g. pressure forces or frictional forces, with the cohesion of the force-locking joint being assured purely by the effective force), that is to say, for example, being clamped, or materially, e.g. by a brazed joint, welded joint and/or diffusion joint, to metallic components of the exhaust gas treatment devices.

The first subregion presented herein is disposed in the first exhaust gas treatment device and, in particular, includes a subregion restricted in all directions (radial direction, axial direction, circumferential direction) around the support body disposed in the first subregion or the attachment point of the support body. In particular, the second subregion is also constructed to be restricted in all directions (radial direction, axial direction, circumferential direction). In particular, the second exhaust gas treatment device has metallic components at least in the region of the second subregion, forming a honeycomb structure through which the exhaust gas can flow.

These metallic components (in particular sheet metal foils, nonwovens, screens, etc.) form contact surfaces by mutual contact. For this purpose, at least one component generally has a structure, e.g. in the manner of a corrugation. Stacking or arranging these components adjacent one another ensures that they touch, e.g. in the manner of strips along the corrugation crests and/or corrugation valleys. These are referred to as contact surfaces, with the term describing the maximum possible region of attachment of the components relative to one another. However, in actual fact these contact surfaces are not used completely for fixing the components relative to one another, with only at most 20%, preferably at most 10% and, particularly preferably, at most 5%, thereof being used. Consequently, provision is made for a significant, predominant proportion of the area of the contact surfaces in fact to be only touching surfaces, with there being the possibility of this touching contact being canceled during use. It is only in the above-indicated small proportion that connecting regions have been produced by hard soldering and/or diffusion. In particular, these brazed joints and/or diffusion joints form a kind of (flexible) skeleton (at least at the second end face of the second exhaust gas treatment device). If appropriate, there may be no brazed joints and/or diffusion joints at all provided at the contact surfaces in the second subregion.

Contrary to the assumption heretofore that the second subregion of the second exhaust gas treatment device, the region used particularly for support, should have as strong a structure as possible, it is now proposed in this case that only small proportions of the contact surfaces formed by mutual contact should have a material joint (brazed joint and/or diffusion joint). Due to this small proportion of material jointing of the contact surfaces, flexibility is achieved at least in the region of the second subregion, making it possible to equalize or compensate for different deformations of the first exhaust gas treatment device relative to the second exhaust gas treatment device which occur during operation, in particular due to different deformation of the respective honeycomb structures, thus avoiding damage to the honeycomb structure of the first exhaust gas treatment device and/or also to the second exhaust gas treatment device and furthermore also ensuring that the at least one support body is not damaged (in particular by the significant reduction in shear stress). In this case, the second subregion is, in particular, disposed on a second end face of the second exhaust gas treatment device, which end face faces the first exhaust gas treatment device, and, from there, extends into a honeycomb structure of the second exhaust gas treatment device.

Heretofore, it has been regarded as important that metal honeycomb bodies should be soldered as completely and over as large an area as possible, especially in the exhaust gas inlet region, ensuring that as far as possible there is no damage to the honeycomb structure due to the exhaust gas pulsations. There is now a departure from this because, particularly in the exhaust gas inlet region, a second subregion with a small proportion of brazed joints is provided, thus enabling the support bodies to move relative to the housing within the second exhaust gas treatment device, in particular. However, placing the first exhaust gas treatment device upstream of the second exhaust gas treatment device allows laminarization of the exhaust gas stream, thus reducing the loads on the exhaust gas inlet side of the second exhaust gas treatment device.

In accordance with another advantageous feature of the configuration of the invention, at least the second exhaust gas treatment device is a honeycomb body, which includes at least one honeycomb structure and a housing which surrounds the honeycomb structure. In this case, the honeycomb structure is formed at least in part by smooth and structured metallic layers. In this way, in particular, (substantially axially extending) flow channels for the exhaust gas are formed, through which the exhaust gas is passed as it flows through the exhaust gas treatment device. In particular, they have a density of at least 50 channels per square centimeter, in particular of more than 200 channels per $cm^2$ or more than 600 channels per $cm^2$. This density relates to the respective end faces of the exhaust gas treatment device, through which the exhaust gas enters the exhaust gas treatment device and from which it exits the latter. In this case, the second subregion can have a different density from the other regions of the honeycomb structure. In particular, the metallically smooth and structured layers are stacked one on top of the other and/or twisted and/or wound together.

In particular, the second subregion of the second exhaust gas treatment device, in which one end of the at least one support body is disposed, includes at least 10, preferably at least 50 and, particularly preferably at least 500, channels and, in particular, extends from the end face of the second exhaust gas treatment device which faces the first exhaust gas treatment device to the attachment point of the end of the support body. In particular, these channels are disposed within a radius around the support body, wherein the radius expands uniformly in all (radial) directions with the increasing number of channels. In particular, the second subregion extends deeper into the honeycomb structure of the second exhaust gas treatment device in the axial direction, in particular by at least 20% and, preferably, by at least 50%, deeper than the depth of the attachment point, measured from the end face facing the first exhaust gas treatment device.

In particular, the second subregion has an extent with a radius of at least 2 mm, preferably at least 5 mm and very particularly preferably at least 8 mm around the attachment point, at least in the radial direction of the exhaust gas treatment device and, in particular, in a spherical shape around the attachment point. As a very particularly preferred option, the second subregion includes the entire second end face of the second exhaust gas treatment device.

In particular, a stainless steel foil suitable for exhaust gas devices is provided as a smooth and/or structured metallic layer, having a thickness of 30 to 160 µm [micrometers], for example. The housing can furthermore also be an (electrically insulated) second housing part, which may be fixed to a first housing part of the first exhaust gas treatment device.

In particular, the configuration has a plurality of support bodies, which are disposed spaced apart in a manner appropriate to the requirements. In particular, all of the support bodies are furthermore disposed in a single second subregion, although it is also possible for a plurality of mutually spaced second subregions to be provided, in each of which, in particular, just one support body is disposed.

In accordance with a further advantageous feature of the configuration of the invention, the first exhaust gas treatment device is formed at least in part by stacks of metallic layers, wherein the layers are spaced apart at least in part by air gaps, at least in the first subregion.

These air gaps serve, in particular, for the electric insulation of the individual metallic layers relative to one another, thus producing an electrically heatable honeycomb body. As a result of these insulating air gaps, the first exhaust gas treatment device has a lower resistance to deformation, at least in subregions of the honeycomb structure, and therefore deformation of the honeycomb structure through lengthening of the metallic layers occurs precisely as a result of the alternating thermal stress on the first exhaust gas treatment device. Due to this deformation of the metallic layers, the support body disposed in the first subregion accompanies this movement and is also subjected to bending forces and shear forces. In particular, in order to compensate for these movements and to reduce the loads, the second subregion of the second exhaust gas treatment device has an appropriate flexibility, and therefore, in this case too, the support body can perform a corresponding movement. In particular, this movement can take place in such a way that a movement in the same direction and, as far as possible, by the same amount takes place in both subregions. This would lead to a parallel movement of the support body, ensuring, in particular, also that the support body does not form an increased resistance to the flow of the exhaust gas stream. In particular, the flexibility of the second subregion (also) allows bending of the support body, resulting in a reduction in the bending forces and shear forces in the region of the attachment points in the second subregion.

In particular, the first subregion and the second subregion are configured independently of one another with regard to the position, number and extent thereof. It should be taken into account in the configuration that the honeycomb structures are embodied in such a way with respect to the stacking, winding or twisting of the individual components thereof that, when the exhaust gas treatment devices heat up, the deformation properties of the components at least do not act contrary to one another. This can be achieved, for example, by winding the layers of the two exhaust gas treatment devices with a unidirectional S shape or similar. The configuration of the support body too should be performed accordingly, thus avoiding the configuration of support bodies in regions of the honeycomb structures that have different deformation properties.

In accordance with an added advantageous feature of the configuration of the invention, the first exhaust gas treatment device is an electrically heatable honeycomb body. For this purpose, the first exhaust gas treatment device has the required electrodes and electric insulators to allow power to be supplied. In this respect, attention is also drawn, in particular, to the introductory remarks relating to the prior art.

In accordance with an additional advantageous feature of the configuration of the invention, the second exhaust gas treatment device has a first end face, which faces away from the first exhaust gas treatment device, and a longitudinal axis. The second exhaust gas treatment device furthermore has contact surfaces of mutually contacting metallic components between the second subregion and the first end face in the direction of the longitudinal axis, only in an axially restricted section, wherein at least 80% of the area of the contact surfaces has brazed joints and/or diffusion joints. In particular, 100% of the contact surfaces are preferably connected to one another materially by brazed joints and/or diffusion joints in this only axially restricted section between the second subregion and the first end face. Slight deviations therefrom are, of course, likewise included. In particular, the axial extent of this section is limited to a length of at most 5 mm, in particular at most 10 mm.

Due to this large-area attachment, provided herein, of the individual metallic components to one another, a high mechanical strength of the second exhaust gas treatment device is achieved. In particular, material attachment in this way ensures that telescoping of the metallic components, i.e. movement in the axial direction relative to a housing of the exhaust gas treatment device, is now only possible to a very limited extent or is completely prevented. In particular, a high resistance to deformation is furthermore ensured by this type of attachment, thereby ensuring that the supporting effect relative to the support bodies is ensured to an adequate extent. In particular, this only axially restricted section of the second exhaust gas treatment device extends over at most a third of the maximum axial length of the honeycomb structure of the second exhaust gas treatment device, in particular over at most a sixth, starting from the first end face.

It is furthermore advantageous if, starting from the first end face, a further section with an axial length of at most 1 mm [millimeter], in particular at most 3 mm, in the direction of the longitudinal axis is free from brazed joints and/or diffusion joints (i.e. is without material connection) and only then is it adjoined by the section with at least 80% to 100% of the area of the contact surfaces having brazed joints and/or diffusion joints. In particular, this axially restricted section with mutually connected contact surfaces exclusively includes the contact surfaces between the metallic components of the honeycomb structure and not between the metallic components and the housing.

However, this axially restricted section also particularly preferably includes the contact surfaces of the metallic components with the housing, wherein, according to a particularly advantageous embodiment, the housing is connected to the honeycomb structure by brazed joints and/or diffusion joints at all contact surfaces between the metallic components and the housing.

In accordance with yet another advantageous feature of the configuration of the invention, the second exhaust gas treatment device has a second end face, which faces the first exhaust gas treatment device, and a longitudinal axis, wherein the second exhaust gas treatment device includes at least one metallic component having regions of different lengths in the direction of the longitudinal axis at the second end face. In this case, the attachment points are disposed at least in part on the longer regions of the at least one component, wherein the longer regions of the component project beyond the shorter regions of the component in the direction of the longitudinal axis at the second end face, at least in the second subregion.

This means, in particular, that, at the second end face, the metallic component has at least one recess, which extends in the axial direction and in a direction parallel to the second end face. In the axial direction, this recess extends over at most 5 mm, preferably at most 10 mm. By using such an embodiment, the second exhaust gas treatment device has a discontinuous end face, at least in the second subregion, in which at least some of the channel walls of the honeycomb structure are disposed so as to be set back when viewed from the second end face. In this case, the regions referred to of the at least one metallic component include, in particular, only a small part of the width of the metallic component, wherein the width extends transversely to the longitudinal axis of the exhaust gas treatment device. In particular, this small part of the width includes at most 5 mm, preferably at most 10 mm. In particular, these shorter regions of the component are disposed in such a way that no longer regions of the components are disposed directly around the support body at the second end face in a second subregion, thus allowing bending of the support body without these longer regions of the component coming into contact in the region of the second end face due to the bending.

In this way, it is also possible, in particular, for the support body to be mounted by using attachment points on regions of the at least one component which are shorter in the direction of the longitudinal axis, in which case there is even less resistance to bending of the support body.

In accordance with yet a further particularly preferred feature of the configuration of the invention, the second exhaust gas treatment device is formed at least with metallic components having at least one recess, wherein the recess is disposed at least in part adjacent an attachment point. In this case, the recess is provided at least in part between a second end face, which faces the first exhaust gas treatment device, and the attachment point. In particular, it furthermore does not extend as far as the second end face but is disposed in the component. This configuration of the recess likewise makes it possible to enhance the flexibility of the attachment point within the second exhaust gas treatment device. The recess ensures that, in this region adjacent the attachment point, there is no support or material attachment of the component on/to further components by mutual contact. As a result, the support body can perform a movement in the region of the attachment, to which there is less resistance. In particular, the recess is not to be confused with openings between individual channels in the honeycomb structure, which allow an exchange between the exhaust gas streams, but is of comparatively larger size and, in particular, includes a region which has a plurality of contact surfaces between the corresponding metallic components in the radial direction or circumferential direction. In particular, the axial length of the recess is at least as great as the extent of the attachment point. In particular, it is also possible for a plurality of recesses to be provided which are disposed in the region of the at least one attachment point, further increasing the flexibility of the attachment point for the support body. In particular, the recesses are also disposed downstream of the attachment points in components which are connected to the support body by attachment points. In particular, the recesses are disposed downstream of and in alignment in the axial direction with the attachment points. In particular, the recess within the metallic components has a length of at most 5 mm, preferably at most 10 mm, in the direction of the longitudinal axis and furthermore has a width of at most 5 mm, preferably at most 10 mm, in a direction transverse to the longitudinal axis.

In accordance with yet an added advantageous feature of the configuration of the invention, the support body is disposed parallel to a longitudinal axis of the first exhaust gas treatment device and of the second exhaust gas treatment device at 20° C. As a result of a thermal stress of up to 800° C. on the configuration, this support body slopes at a maximum of 2 degrees of angle relative to the longitudinal axis. This parameter describes the flexibility of the configuration in as much as skewing of the support body due to the low resistance to deformation of the second exhaust gas treatment device is avoided, and the support body can accordingly move substantially in parallel within the configuration. This parallel movement is preferred since, in that case, no shear forces or bending forces are transmitted through the support body, and hence failure of the support body or else, failure of the attachment points or of components of the exhaust gas treatment device is avoided. However, at least the configuration avoids fixing of the support body by the second exhaust gas treatment device in the radial direction or in the circumferential direction, and, as a result, the shear forces and bending forces which would otherwise occur can be sufficiently reduced by this measure alone.

In accordance with yet an additional advantageous feature of the configuration of the invention, the second exhaust gas treatment device is a honeycomb body having a multiplicity of channels, through which an exhaust gas can flow, wherein the second subregion at least:
a) has a smaller number of channels per unit of surface area than the remaining regions of the honeycomb body, or
b) is formed from metallic layers which have a smaller material thickness than the metallic layers in the remaining regions of the honeycomb body.

In particular, a small number of channels per unit surface area ensures that the flexibility of the attachment points in this subregion is greater. This is achieved by the fact that fewer contact surfaces and fewer support points between the metallic components are present or that they are disposed further apart. The same applies if the metallic layers have a smaller material thickness since, in this case, the resistance to deformation of the layers decreases.

In particular, the second subregion extends over the entire second end face of the second exhaust gas treatment device. However, the preferred option is one in which there is at least one residual region, in particular an encircling residual region, in the vicinity of the housing at this second end face, having a higher proportion of the surface with material attachments between the metallic components than in the second subregion.

The invention proposes a second exhaust gas treatment device as a "support catalytic converter" which, on one hand, has a highly flexible honeycomb structure, at least in a second subregion, but, on the other hand, provides a supporting function for an electrically heatable honeycomb body in which a high stiffness is provided, at least in a section disposed downstream. It is thus possible to avoid telescoping of the honeycomb structure of the second exhaust gas treatment device while, at the same time, allowing movement of the honeycomb structure in the region of the second end face, thus avoiding bending of the support bodies in conjunction with relatively high bending forces and shear forces. At least, however, flexibility in the region of the second end face is increased to such an extent that bending forces and shear forces caused by the configuration of support bodies can be significantly reduced. The freedom of movement of the attachment points of the support bodies which is provided by the increased flexibility, at least in the second subregion, enables the attachment points in the second subregion to accompany any movement arising from the inevitably occurring movement of the attachment points of the support bodies in the first subregion of the first exhaust gas treatment device. Through the use of the invention, it is thus possible to avoid damage to the support bodies and damage to the honeycomb bodies and to ensure a durable configuration.

In particular, at least one second subregion is disposed in the center (in the radial direction) of the second exhaust gas treatment device, wherein, in this case, a (significantly) larger proportion of the contact surfaces has at least brazed joints or diffusion joints. In particular, the "center" includes a radial region around the longitudinal axis of the configuration of 50% of the maximum diameter of the honeycomb structure of the second exhaust gas treatment device. In particular, the contact surfaces are connected to one another over up to 100% of the area thereof. In particular, however, additional second subregions are in this case provided in the radially outer region (outside the "center") of the honeycomb structure of the second exhaust gas treatment unit, with the interconnected areas of the contact surfaces accounting for at most 20%.

The invention is employed, in particular, in a motor vehicle having an exhaust gas system, wherein the exhaust gas system is embodied with a configuration illustrated herein in accordance with the invention. For this purpose, the configuration can be connected to a voltage source and a control unit, enabling an electrically heatable honeycomb body (first exhaust gas treatment device) to be activated as required.

Other features which are considered as characteristic for the invention are set forth in the appended claims, noting that the features presented individually in the claims can be combined in any technologically meaningful way and give rise to additional embodiments of the invention.

Although the invention is illustrated and described herein as embodied in a configuration having two interconnected exhaust gas treatment devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
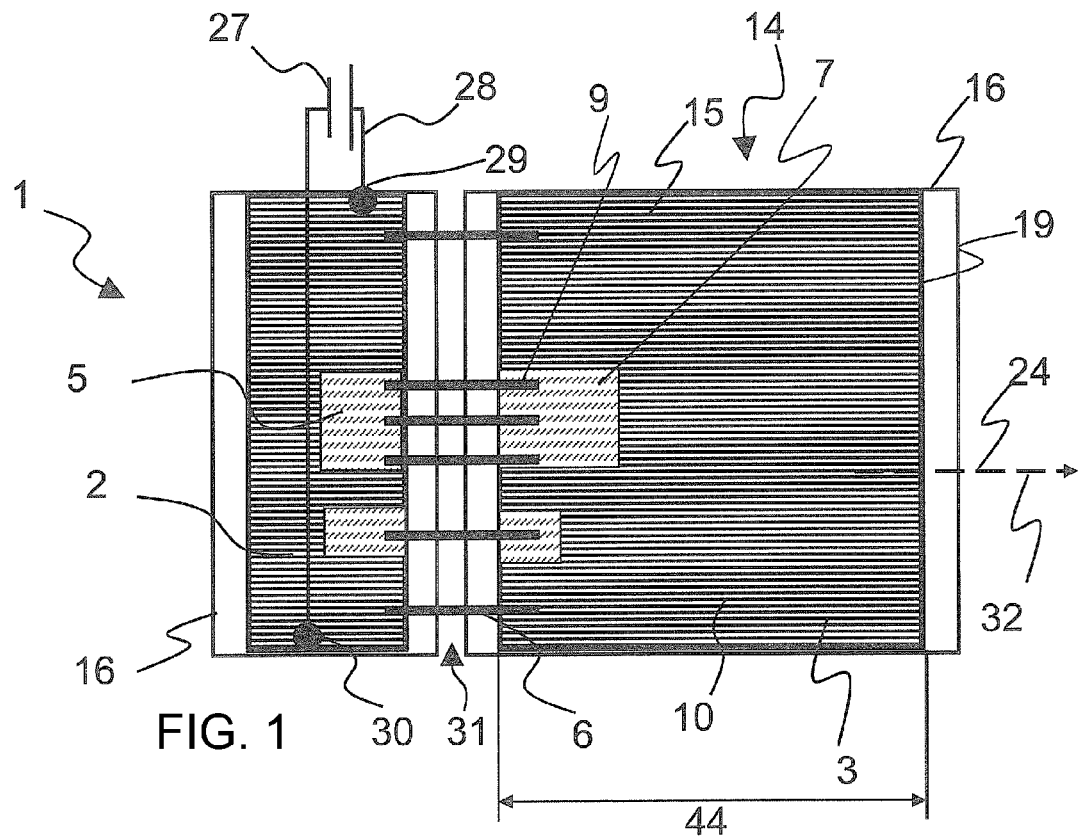
FIG. 1 is a diagrammatic, longitudinal-sectional view of a configuration having a first exhaust gas treatment device and a second exhaust gas treatment device.

Referring now to the figures of the drawings in detail and first, particularly, to FIG. 1 thereof, there is seen a configuration 1 having a first exhaust gas treatment device 2 and a second exhaust gas treatment device 3, through which an exhaust gas 24 successively flows in a throughflow direction 32. The first exhaust gas treatment device 2 has a housing 16 and is constructed as an electrically heatable honeycomb body. An electric terminal 27 is electrically conductively connected to the first exhaust gas treatment device 2 through a second terminal 30. An electric ground 28 is connected to the first exhaust gas treatment device 2 through a first terminal 29. The first exhaust gas treatment device 2 furthermore has a first subregion 5, in which respective ends 9 of a plurality of support bodies 6 are disposed. Other support bodies 6 which are not disposed in a first subregion 5 of the first exhaust gas treatment device 2 are furthermore provided in this case. The first exhaust gas treatment device 2 and the second exhaust gas treatment device 3 are spaced apart from one another by a gap 31 and the gap 31 is bridged by the support bodies 6. The ends 9 of the support bodies 6 are correspondingly at least partially disposed in a second subregion 7 in the second exhaust gas treatment device 3. The second exhaust gas treatment device 3 likewise has a housing 16 and a honeycomb structure 15 through which an exhaust gas can flow and which together form a honeycomb body 14. The honeycomb structure 15 is formed at least in part by metallic components 10 and extends in the throughflow direction 32 toward a first end face 19, which is disposed downstream. The honeycomb structure 15 is in contact with the housing 16 over an axial length 44.

Figure 2:
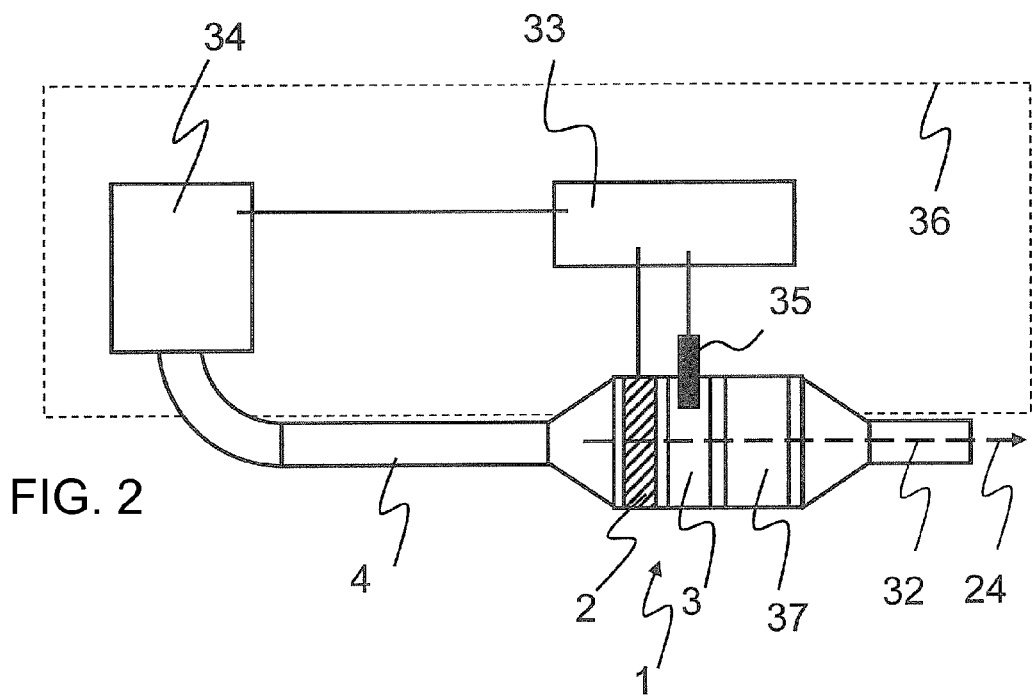
FIG. 2 is a schematic and block diagram of a motor vehicle having a configuration.

FIG. 2 shows a motor vehicle 36 having an internal combustion engine 34, an exhaust gas line 4 and a configuration 1 disposed in the exhaust gas line 4. The configuration 1 has a first exhaust gas treatment device 2, a second exhaust gas treatment device 3 and a further exhaust gas purification component 37, through which an exhaust gas 24 flows in succession but in any order in the throughflow direction 32. A sensor 35 is disposed in the second exhaust gas treatment device 3 and connected to a controller 33. This sensor 35 includes temperature sensors, for example, allowing heating to be accomplished by appropriate sensor signals, of an electrically heatable honeycomb body which is formed, in this case, by the first exhaust gas treatment device 2.

Figure 3:
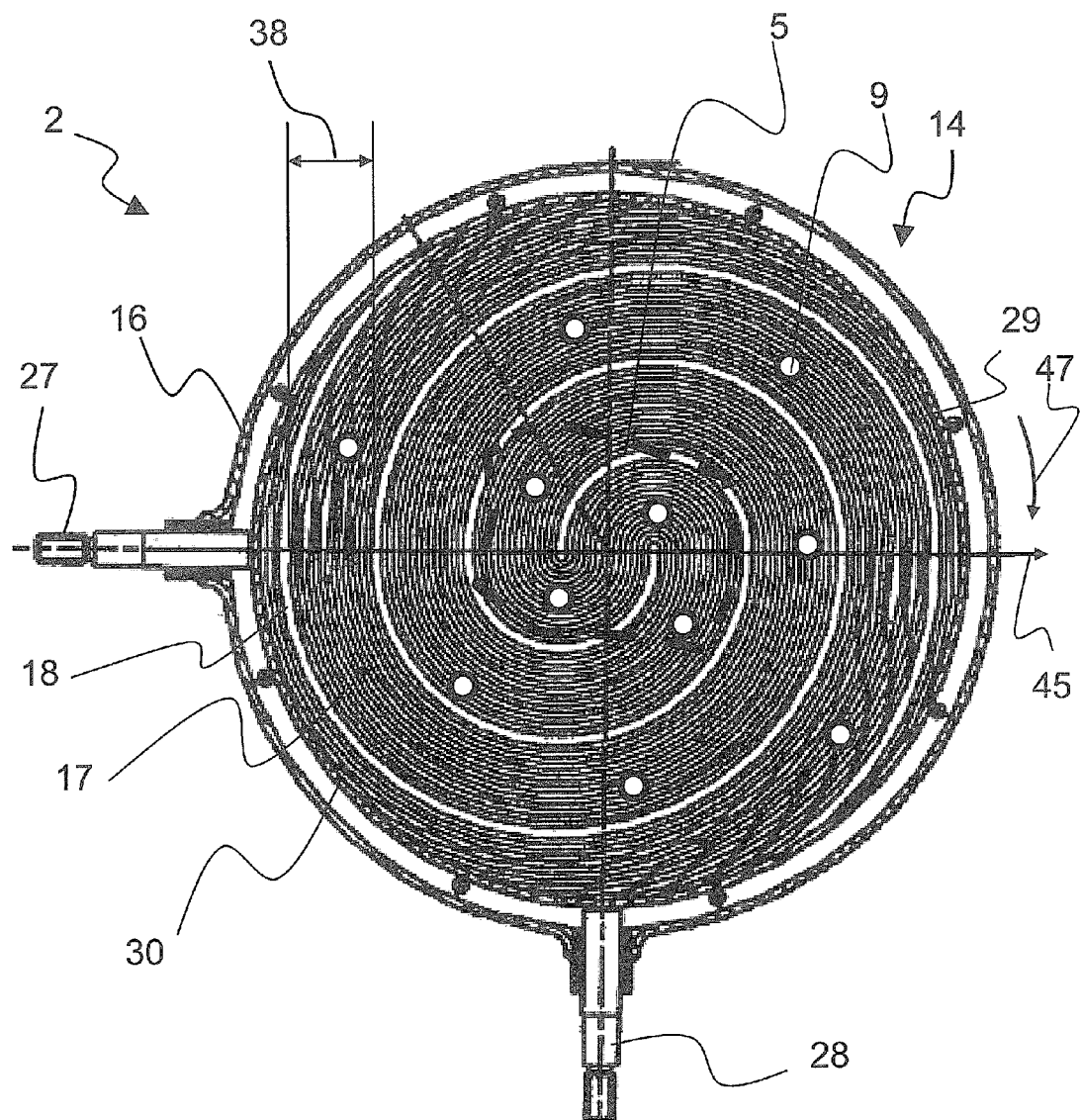
FIG. 3 is a cross-sectional view of an electrically heatable honeycomb body.

FIG. 3 shows an electrically heatable honeycomb body 14 in a cross section. This electrically heatable honeycomb body 14 corresponds, for example, to the first exhaust gas treatment device 2 in FIG. 1. The honeycomb body 14 includes a housing 16 and a honeycomb structure 15 which, for its part, is formed by metallic layers 17 of smooth and corrugated foils. In this case, these layers 17 are stacked to a stack height 38 and twisted together, with the layers 17 having the stack height 38 each being spaced apart from one another by air gaps 18. Electric insulation of the layers 17 from one another is thus ensured, which in turn ensures that uniform heating of the electrically heatable honeycomb body 14 is possible. The individual layers 17, which are in each case combined to provide a stack height 38, are brought into contact with an electric terminal 27 through a second terminal 30 and with an electric ground 28 through a first terminal 29, thus producing a flow of electric current. In the cross section, it can be seen that the respective ends 9 of the support bodies are disposed within the honeycomb structure 15 and within a first subregion 5. By virtue of the air gaps 18 and as a result of the special construction of the electrically heatable catalytic converter, there is movement of the support bodies at least in a radial direction 45 and/or in a circumferential direction 47.

Figure 4:
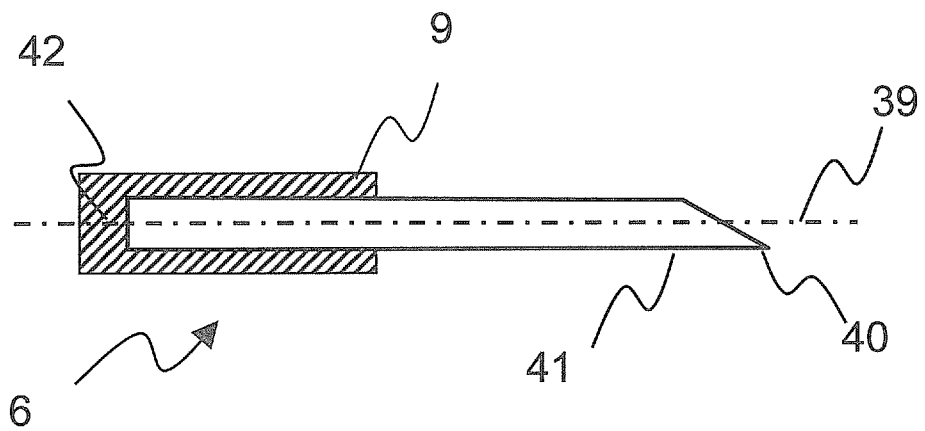
FIG. 4 is an enlarged, longitudinal-sectional view of a support body.

FIG. 4 shows a support body 6 which is formed by a round pin 41 that extends along a center line 39. The support body 6 has an electric insulator 42 at the left-hand end 9 thereof. The pin 41 of the support body 6 has a tip 40 at the right-hand end 9 thereof, which enables the support body 6 to be inserted more easily into the honeycomb structure of an exhaust gas treatment device.

Figure 5:
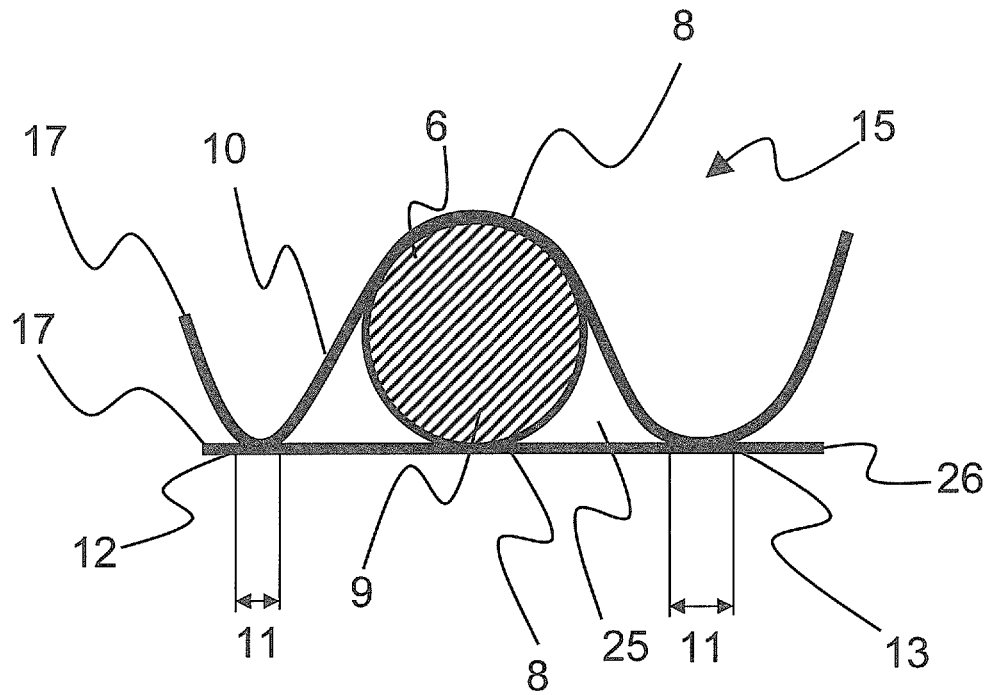
FIG. 5 is a cross-sectional view of a configuration of a support body in a honeycomb structure.

FIG. 5 shows the configuration of a support body 6 within a honeycomb structure 15. In this case, a corrugated layer 17 and a smooth layer 17 act as metallic components 10 forming a channel 25. One end 9 of a support body 6 is disposed within this channel 25 and is connected to the layer(s) 17 by attachment points 8. The layers 17 have brazed or soldered joints 12 and/or diffusion joints 13 at contact surfaces 11 and are thus connected materially to one another. The layers 17 furthermore have a material thickness 26.

Figure 6:
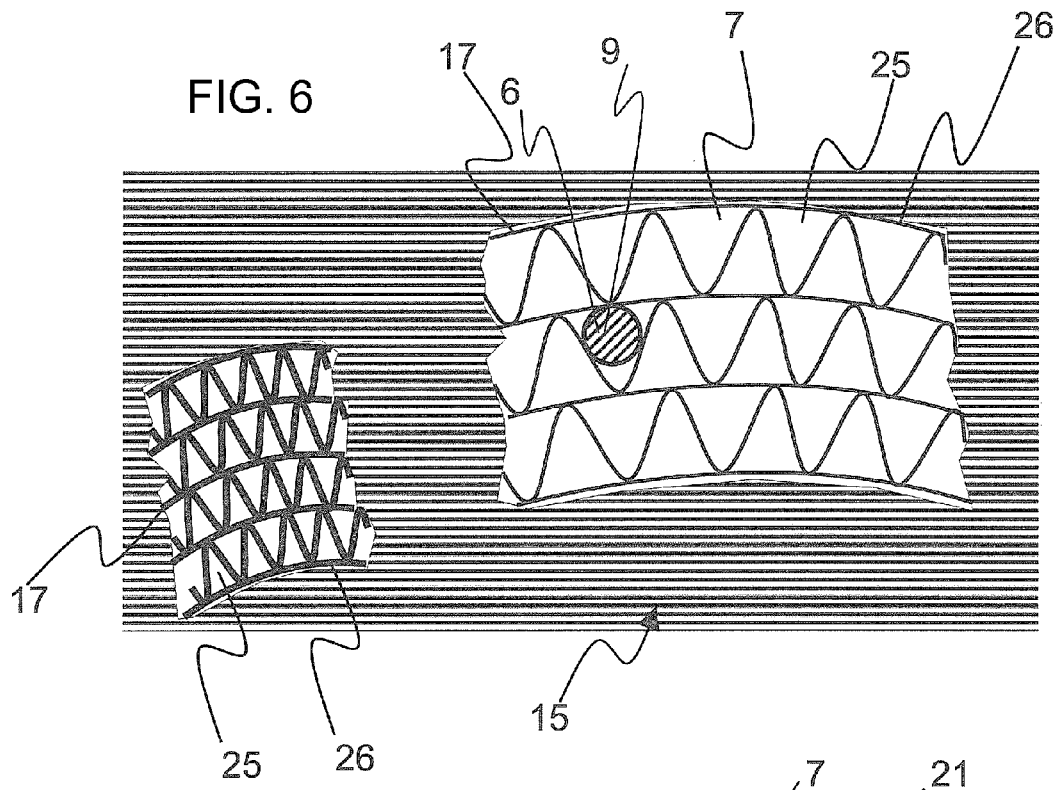
FIG. 6 is a longitudinal-sectional view of another configuration of a support body in a honeycomb structure.

FIG. 6 shows another honeycomb structure 15 in cross section, in which the honeycomb structure 15 is formed at least in part by smooth and corrugated layers 17 that form channels 25 and have a material thickness 26. At least in a second subregion 7, the honeycomb structure 15 is formed by layers 17 that have a larger channel cross section 25 and, if appropriate, a smaller material thickness 26. The respective ends 9 of support bodies 6 are disposed in this second subregion 7.

Figure 7:
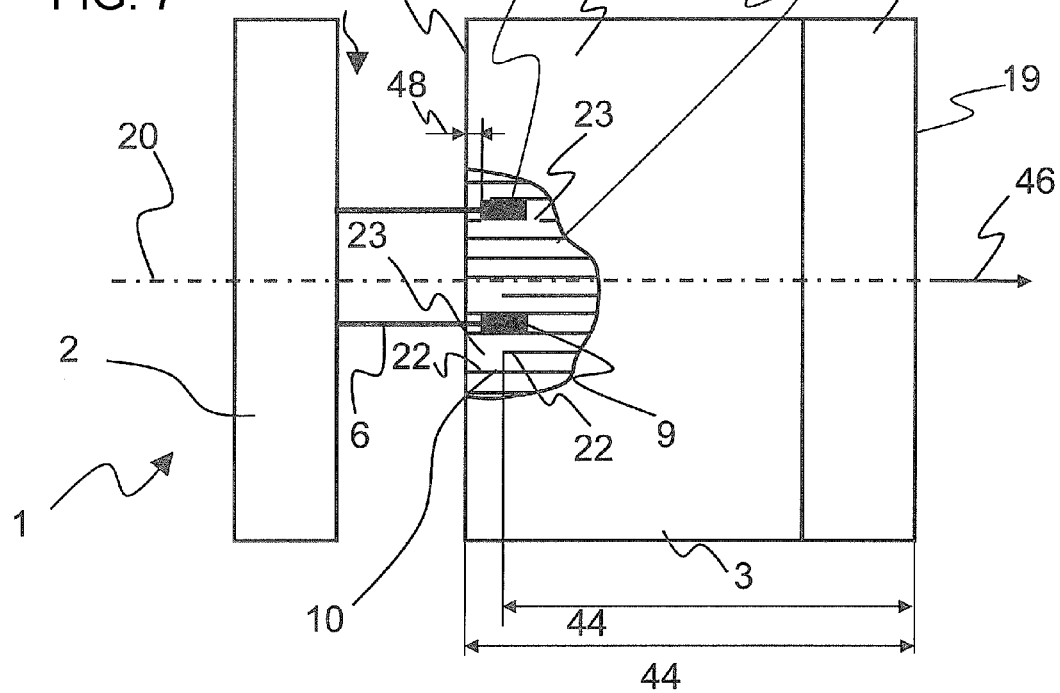
FIG. 7 is a partly broken-away, side-elevational view of another variant embodiment of a configuration.

FIG. 7 shows another configuration 1 having a first exhaust gas treatment device 2 and a second exhaust gas treatment device 3. The devices are disposed in series in axial direction 46 along a longitudinal axis 20 and are separated from one another by a gap 31. This gap 31 is bridged by support bodies 6 and the two exhaust gas treatment devices 2, 3 are therefore connected to one another by the support bodies 6. The second exhaust gas treatment device 3 has a second subregion 7, which extends from a second end face 43 into the honeycomb structure 15. The ends 9 of the support bodies 6 within the honeycomb structure 15 are connected to the honeycomb structure 15 at attachment points 8. At least in the second subregion 7, the honeycomb structure 15 is formed by metallic components 10, each having regions 22 of different lengths 44 along the longitudinal axis 20. The different lengths 44 lead to the formation of recesses 23, starting from the second end face 43. Further recesses 23 within the component 10, i.e. at a distance from the second end face 43, are likewise provided. The resulting absence of contact surfaces in the region of the attachment points 8 between the regions of the metallic component 10 of shorter length 44 or the recesses 23 and the components 10 on which the attachment points 8 are disposed ensures the flexibility of the attachment points 8 and of the support bodies 6 within the second subregion 7. The attachment point 8 of the support body 6 in the second subregion 7 is disposed at a depth 48, starting from the second end face 43, in the direction of the longitudinal axis 20. There is a larger proportion of materially interconnected contact surfaces of the components 10 in a section 21 between the second subregion 7 and the first end face 19, thereby ensuring the stiffness of the honeycomb structure 15 of the second exhaust gas treatment device 3.

The invention claimed is:

1. A configuration, comprising:
an exhaust gas line;
first and second exhaust gas treatment devices disposed in series in said exhaust gas line, said first exhaust gas treatment device having a first subregion and said second exhaust gas treatment device having a second subregion; and
at least one support body interconnecting said first and second exhaust gas treatment devices, said at least one support body having opposite ends respectively connected to said subregions at attachment points;
at least said second subregion being formed by metallic components forming contact surfaces by contacting each other, said contact surfaces having areas and at most 20% of said areas of said contact surfaces having at least brazed joints or diffusion joints.

2. The configuration according to claim 1, wherein at least said second exhaust gas treatment device is a honeycomb body having at least one honeycomb structure and a housing surrounding said honeycomb structure, said honeycomb structure being formed at least in part by smooth and structured metallic layers.

3. The configuration according to claim 2, wherein said first exhaust gas treatment device is formed at least in part by stacks of metallic layers, and said metallic layers, at least in said first subregion, are spaced apart at least in part by air gaps.

4. The configuration according to claim 1, wherein said first exhaust gas treatment device is an electrically heatable honeycomb body.

5. The configuration according to claim 1, wherein:
said second exhaust gas treatment device has a longitudinal axis and a first end face facing away from said first exhaust gas treatment device;
said contact surfaces of said metallic components contact each other between said second subregion and said first end face in direction of said longitudinal axis in an exclusively axially restricted section; and
at least 80% of said areas of said contact surfaces have at least one of brazed joints or diffusion joints.

6. The configuration according to claim 5, wherein:
said second exhaust gas treatment device has a second end face facing said first exhaust gas treatment device;
at least one of said metallic components of said second exhaust gas treatment device has longer regions and shorter regions in direction of said longitudinal axis;
said attachment points are disposed at least in part on said longer regions of said at least one component; and
said longer regions of said at least one component project beyond said shorter regions of said at least one component in direction of said longitudinal axis at said second end face at least in said second subregion.

7. The configuration according to claim 5, wherein:
said second exhaust gas treatment device has a second end face facing said first exhaust gas treatment device;
at least one of said metallic components of said second exhaust gas treatment device has at least one recess;
said at least one recess is disposed at least in part adjacent one of said attachment points; and
said at least one recess is disposed at least in part between said second end face and said one attachment point.

8. The configuration according to claim 1, wherein:
said first and second exhaust gas treatment devices have a longitudinal axis; and
said at least one support body is configured to be disposed parallel to said longitudinal axis at 20° C. and slope at a maximum of 2 degrees of angle relative to said longitudinal axis as a result of a thermal stress on the configuration of up to 800° C.

9. The configuration according to claim 1, wherein:
said second exhaust gas treatment device is a honeycomb body having a multiplicity of channels through which an exhaust gas can flow;
said honeycomb body has remaining regions outside said second subregion; and
said second subregion at least:
a) has a smaller number of channels per unit of surface area than said remaining regions of said honeycomb body, or
b) is formed from metallic layers having a smaller material thickness than metallic layers in said remaining regions of said honeycomb body.

\* \* \* \* \*